(12) United States Patent
Aoki et al.

(10) Patent No.: US 11,397,150 B2
(45) Date of Patent: Jul. 26, 2022

(54) MEASURING DEVICE, MEASUREMENT ABNORMALITY DETECTING METHOD, AND PROGRAM

(71) Applicant: OTSUKA PHARMACEUTICAL CO., LTD., Tokyo (JP)

(72) Inventors: Youichi Aoki, Toda (JP); Tetsuya Noda, Hino (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 155 days.

(21) Appl. No.: 16/466,781

(22) PCT Filed: Dec. 5, 2017

(86) PCT No.: PCT/JP2017/043635
§ 371 (c)(1),
(2) Date: Feb. 18, 2020

(87) PCT Pub. No.: WO2018/105607
PCT Pub. Date: Jun. 14, 2018

(65) Prior Publication Data
US 2021/0025821 A1 Jan. 28, 2021

(30) Foreign Application Priority Data
Dec. 9, 2016 (JP) .............................. JP2016-239297

(51) Int. Cl.
*G01N 21/64* (2006.01)
*G01N 21/896* (2006.01)
*G01N 21/94* (2006.01)

(52) U.S. Cl.
CPC ....... *G01N 21/648* (2013.01); *G01N 21/6428* (2013.01); *G01N 21/896* (2013.01); *G01N 21/94* (2013.01); *G01N 2021/6439* (2013.01)

(58) Field of Classification Search
CPC ........... G01N 2021/6439; G01N 21/17; G01N 21/64; G01N 21/6428; G01N 21/648;
(Continued)

(56) References Cited

U.S. PATENT DOCUMENTS 5,547,849 A 8/1996 Baer et al.
6,469,785 B1 * 10/2002 Duveneck ............ G01N 21/648
422/82.11
(Continued)

FOREIGN PATENT DOCUMENTS

JP 2004-333333 A 11/2004
JP 2004333333 A * 11/2004 ............. G01N 21/64
(Continued)

OTHER PUBLICATIONS

International Patent Application No. PCT/JP2017/043635; Int'l Search Report; dated Feb. 20, 2018; 2 pages.
(Continued)

*Primary Examiner* — Samuel P Siefke
*Assistant Examiner* — Tingchen Shi
(74) *Attorney, Agent, or Firm* — BakerHostetler

(57) ABSTRACT

Presently disclosed is a way to provide a measuring device capable of easily detecting measurement abnormality without increasing load in hardware. The measuring device may include: an emission means that may emit light to a measurement target region; a light measurement means that may measure light output from the measurement target region by emission with the emission means; a driving means that may move a position of at least one of the measurement target region and the emission means; and a determination means that may compare measurement values of the light measured a plurality of times by the light measurement means while changing positions of the measurement target region by the driving means and thereby determines abnormality of a (Continued)

measurement result. The determination means may determine measurement abnormality in a case where a reference measurement value being a measurement value obtained for a first time is lower than a comparison measurement value being a highest measurement value among measurement values obtained for second and subsequent times.

16 Claims, 14 Drawing Sheets

(58) Field of Classification Search
CPC ...... G01N 21/896; G01N 21/94; G01N 33/53; G01N 21/85; G01N 21/958
See application file for complete search history.

(56) References Cited

U.S. PATENT DOCUMENTS

| | | | |
|---|---|---|---|
| 2003/0156323 A1* | 8/2003 | Overbeck | G02B 21/002 359/385 |
| 2004/0179193 A1* | 9/2004 | Maezono | G01N 21/896 356/239.1 |
| 2008/0087068 A1* | 4/2008 | Roth | G01N 15/1404 73/1.34 |
| 2013/0175457 A1* | 7/2013 | Wada | G01N 21/648 250/459.1 |
| 2014/0117255 A1* | 5/2014 | Hikage | G01N 33/54373 250/459.1 |
| 2020/0271593 A1* | 8/2020 | Noda | G01N 21/648 |

FOREIGN PATENT DOCUMENTS

| | | | |
|---|---|---|---|
| JP | 2005-291795 A | | 10/2005 |
| JP | 2008-102027 A | | 5/2008 |
| JP | 2008-292283 A | | 12/2008 |
| JP | 2009008603 A | * | 1/2009 |
| JP | 2011-247656 A | | 12/2011 |
| JP | 2014-021008 A | | 2/2014 |
| JP | 2014-041060 A | | 3/2014 |
| JP | 2015-082088 A | | 4/2015 |
| WO | WO 2012/172987 A1 | | 12/2012 |
| WO | WO 2014/171139 A1 | | 10/2014 |
| WO | WO 2015/015898 A1 | | 2/2015 |
| WO | WO 2015/029595 A1 | | 3/2015 |
| WO | WO 2016/152159 A1 | | 9/2016 |
| WO | WO-2016152159 A1 | * | 9/2016 ............. G01N 21/64 |

OTHER PUBLICATIONS

European Patent Application No. 17877866.8; Official Action dated Oct. 15, 2020; 7 pages.
European Patent Application No. 17877866.8; Extended Search Report; dated Nov. 8, 2019; 14 pages.
International Patent Application No. PCT/JP2017/043635; Int'l Preliminary Report on Patentability; dated Jun. 11, 2019; 6 pages.

* cited by examiner

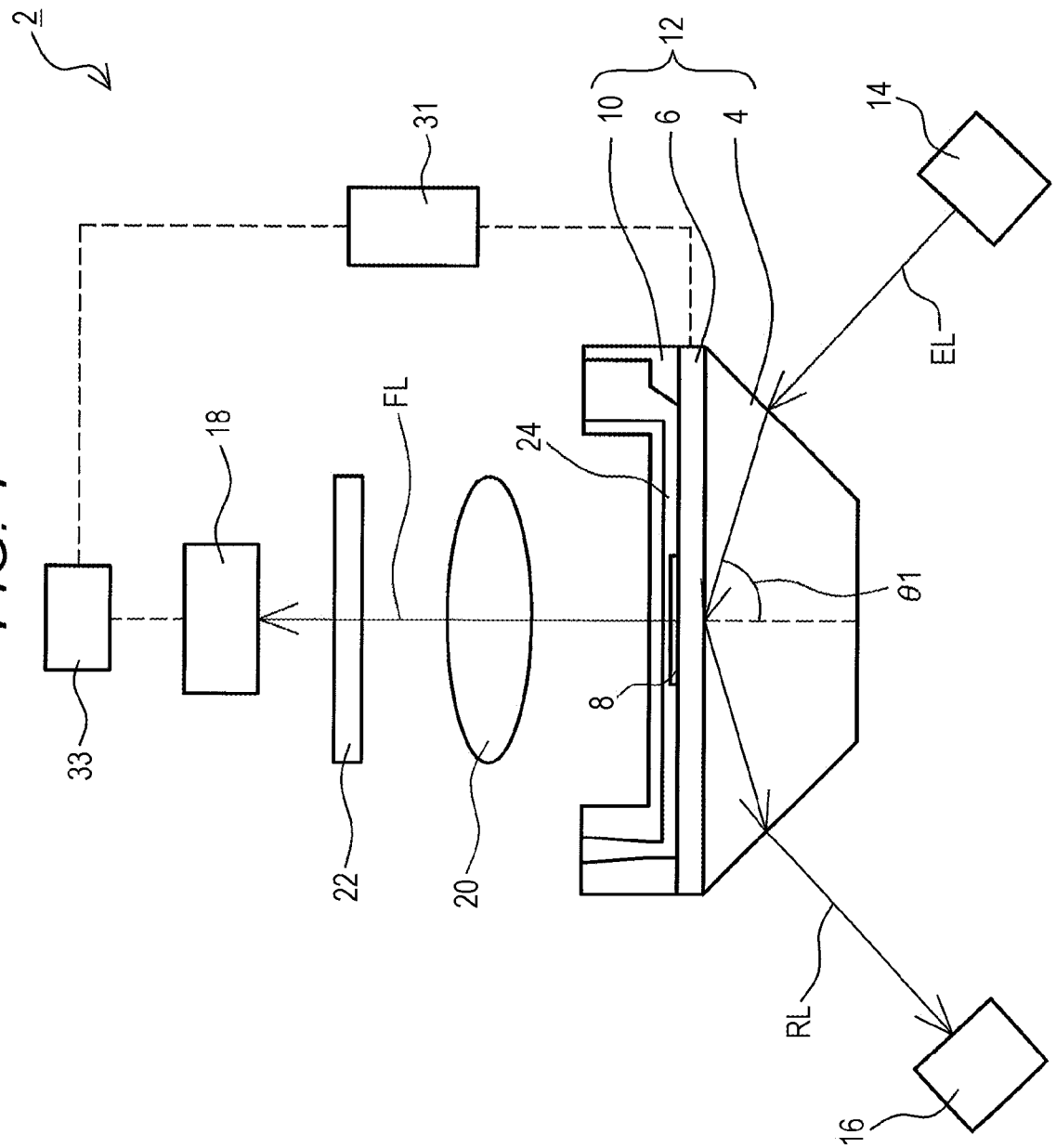

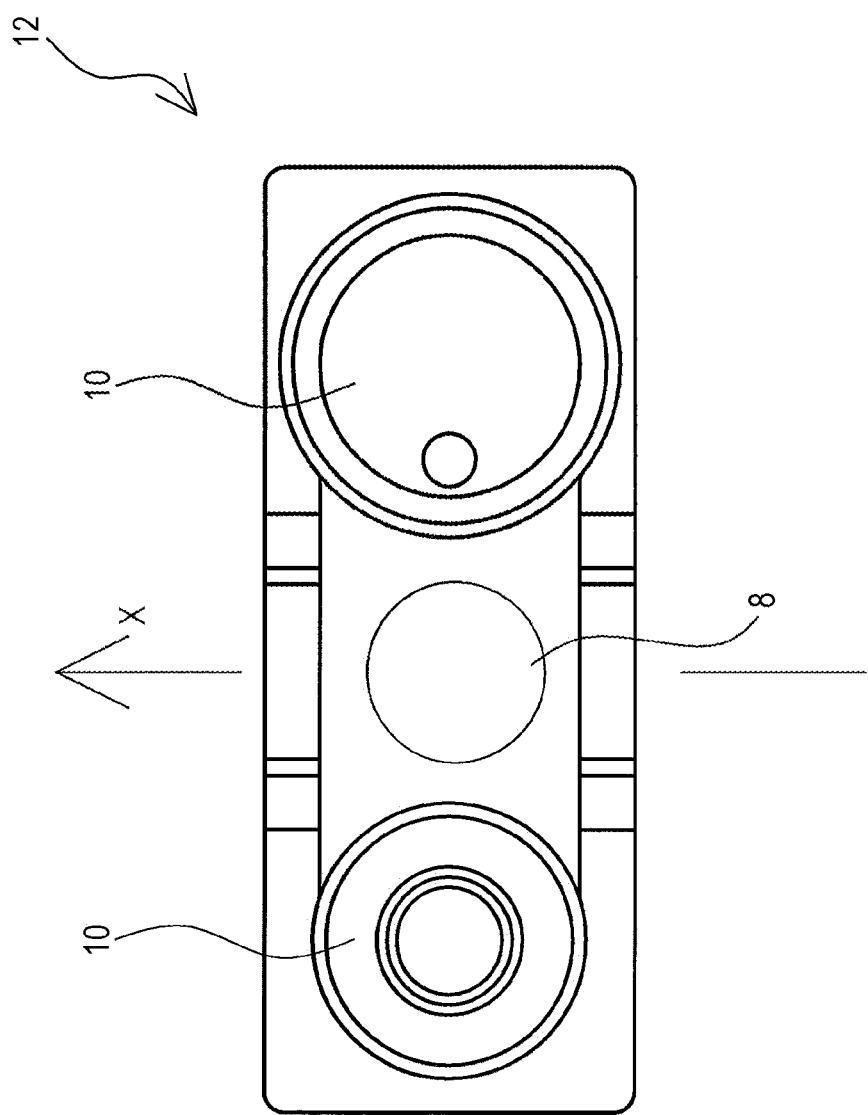

X DIRECTION

φ1.8mm

φ1.5mm

φ1.0mm

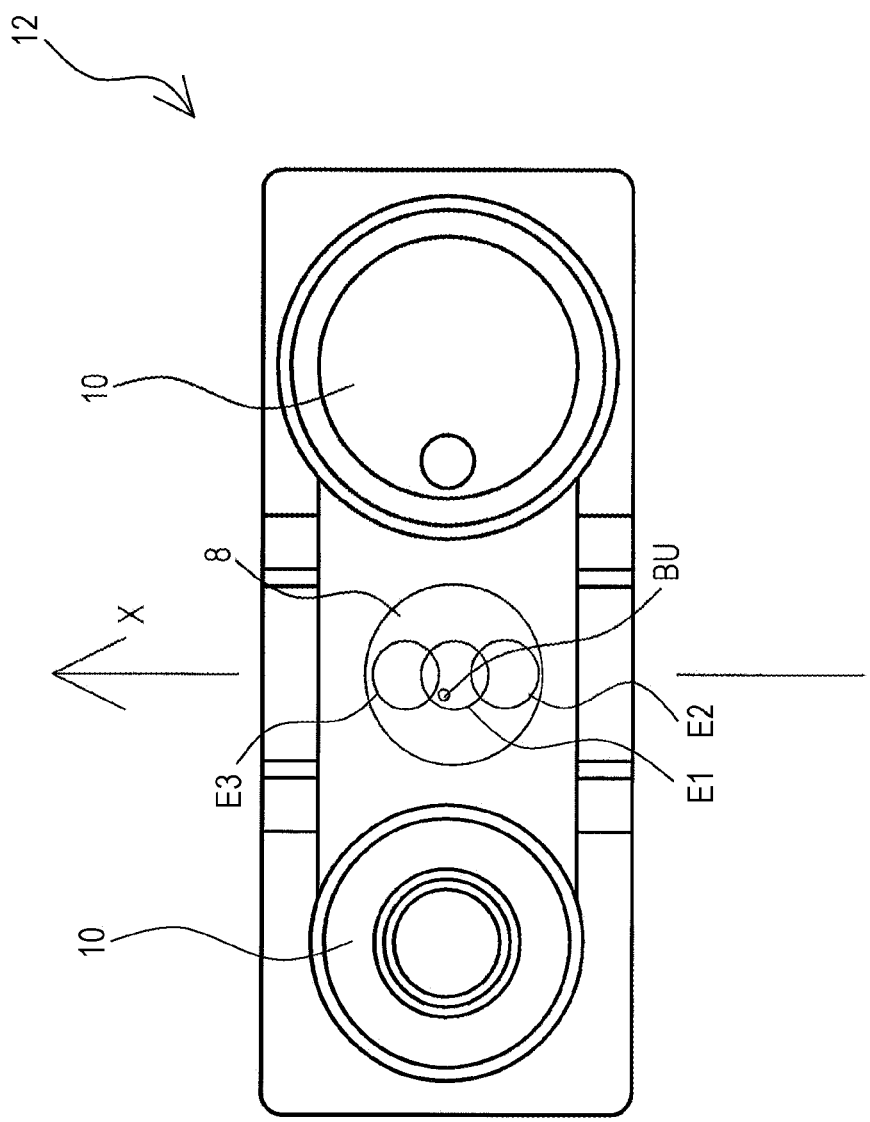

MEASURING DEVICE, MEASUREMENT ABNORMALITY DETECTING METHOD, AND PROGRAM

CROSS-REFERENCE TO RELATED APPLICATIONS

The present application is a national stage entry of International Patent Application No. PCT/JP2017/043635, filed on Dec. 5, 2017 and claims priority to Japanese Patent Application No. 2016-239297, filed on Dec. 9, 2016, the contents of which are incorporated herein by reference in their entirety.

BACKGROUND

Technical Field

The present disclosure relates to a measuring device, a measurement abnormality detecting method, and a program for determining measurement abnormality when measurement of a measurement target is inhibited by a bubble, a foreign body, or the like.

Related Art

Conventionally, there are many techniques for detecting measurement abnormality. A known example of these techniques is an electrolytic analyzer that determines bubble noise abnormality caused by a bubble entering a specimen channel at ion concentration measurement (refer to Patent Literature 1, for example). This electrolytic analyzer determines bubble noise abnormality when a difference in ion concentration of internal standard solution before and after specimen measurement exceeds a reference value.

However, since this electrolytic analyzer is based on the use of internal standard solution, it is difficult to measure the concentration of a substance having a wide concentration range that is not predictable, even though it would be possible to measure the concentration of a substance whose concentration range is known. In a case where it is difficult to use the internal standard solution in this manner, it is necessary to judge measurement abnormality using same samples.

Here, as a conventional example in which measurement abnormality judging using the same sample is performed, a method using scattered light is known (for example, refer to Patent Literature 2). While this method using scattered light can measure reaction as a great change as compared with the method of measuring the transmitted light, this method has a disadvantage that it is easily influenced by foreign body reaction. Examples of the foreign body reaction include growth of a bubble on an optical path due to precipitation of dissolved oxygen, nonspecific agglutination reaction of foreign body contained in the blood, and nonspecific agglutination reaction of dirt contained in the reaction solution.

Note that this method using scattered light is a method applicable with the presence of a phenomenon peculiar to scattering, and thus, is not applicable in an apparatus that uses a measurement method other than the scattering method. In addition, in order to utilize the characteristics of scattered light, a plurality of light receivers corresponding to angles are needed, increasing the load on the apparatus.

For this reason, it is preferable to provide a means capable of determining the measurement abnormality without using scattered light. As a specific example of this means, there is also known a foreign body detector that observes inside of a channel with a camera and identifies a foreign body (for example, refer to Patent Literature 3). This foreign body detector determines whether a target object is a foreign object or a bubble on the basis of the shape of the target object observed in the channel.

Citation List—Patent Literature

Patent Literature 1: JP 2014-41060 A
Patent Literature 2: JP 2014-21008 A
Patent Literature 3: JP 2008-102027 A

SUMMARY

The foreign body detector described above, however, leads to an increase in the burden in development of analysis software in addition to an increase in the load in hardware. Moreover, since the above-described foreign body detection means detects a moment of presence of a foreign body, it would be difficult to detect the foreign body during reaction merely by detection at measurement. In order to detect a foreign body during reaction, there is a need to keep monitoring constantly during the reaction, increasing the load. Furthermore, observation during reaction or measurement need preparation of a special arrangement relationship between the original reaction apparatus, measuring device and foreign body detector, or the like.

An object of the present disclosure may be to provide a measuring device, a measurement abnormality detecting method, and a program capable of easily detecting measurement abnormality without increasing load in hardware.

In order to achieve at least one of the above objects, a measuring device, a measurement abnormality detecting method, and a program reflecting one aspect of the present disclosure may include the following items.

A measuring device including:
  an emission means that emits light to a measurement target region; a light measurement means that measures light output from the measurement target region by emission with the emission means; a driving means that moves a position of at least one of the measurement target region and the emission means; and a determination means that compares measurement values of the light measured a plurality of times by the light measurement means while changing positions of the measurement target region by the driving means and thereby determines abnormality of a measurement result, in which the determination means determines measurement abnormality in a case where a reference measurement value being a measurement value obtained for a first time is lower than a comparison measurement value being a highest measurement value among measurement values obtained for second and subsequent times.

A measurement abnormality detecting method including:
  a light measurement step of emitting light to a measurement target region and thereby measuring light output from the measurement target region; and a determination step of comparing measurement values of the light measured a plurality of times while changing positions of the measurement target region and thereby determining abnormality of a measurement result, in which the determination step determines measurement abnormality in a case where a reference measurement value being a measurement value obtained for a first time is lower than a comparison measurement value being a highest measurement value among measurement values obtained for second and subsequent times.

A program causing a computer to execute functions including:

a light measurement function of emitting light to a measurement target region and thereby measuring light output from the measurement target region; and a determination function of comparing measurement values of the light measured a plurality of times while changings position of the measurement target region and thereby determining abnormality of a measurement result, in which the determination function determines measurement abnormality in a case where a reference measurement value being a measurement value obtained for a first time is lower than a comparison measurement value being a highest measurement value among measurement values obtained for second and subsequent times.

According to the present disclosure, it may be possible to provide a measuring device, a measurement abnormality detecting method, and a program capable of easily detecting measurement abnormality without increasing load in hardware.

BRIEF DESCRIPTION OF DRAWINGS

FIG. 1 is a view illustrating a configuration of a measuring device according to an embodiment.

FIG. 2 is a top view of a chip structure according to the embodiment.

FIG. 13 is a view illustrating a position of an irradiation area and a bubble in Example 5.

DESCRIPTION OF EMBODIMENTS

Figure 3A:
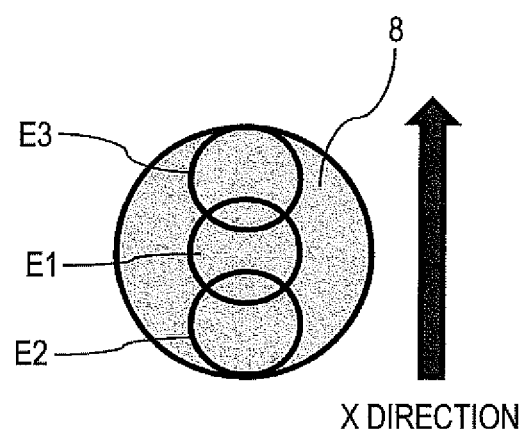
FIG. 3 is a view illustrating a position of an irradiation area and a measurement result of fluorescence according to the embodiment.

Hereinafter, a measuring device according to an embodiment of the present disclosure will be described with reference to the drawings using a measuring device for surface plasmon field-enhanced fluorescence spectroscopy (SPFS) as an example. FIG. 1 is a view illustrating a configuration of a measuring device 2 according to the present embodiment. As illustrated in FIG. 1, the measuring device 2 includes a chip structure 12 having a metal thin film 6 provided on a surface of a prism 4 which is a dielectric member and having a reaction field 8 and a liquid port 10 provided on a surface of the metal thin film 6.

The measuring device 2 further includes, on the prism 4 side of the chip structure 12: an emission means 14 that emits excitation light EL incident into the prism 4 to be directed toward the metal thin film 6; and a light receiving means 16 that receives reflected light RL, that is, light emitted from the emission means 14 and reflected by the metal thin film 6.

On the reaction field 8 side of the chip structure 12, there is provided a light measurement means 18 that measures light amount of fluorescence FL emitted from a fluorescent substance described below. Between the reaction field 8 and the light measurement means 18, a light collecting member 20 and a filter 22 are provided.

The measuring device 2 further includes: a driving means 31 moves the position of the chip structure 12; and a control means 33 that integrally controls individual portions of the measuring device 2. The control means 33 (determination means) performs determination of measurement abnormality of the fluorescence FL measured by the light measurement means 18 and control of the driving means 31, or the like.

Here, before the measurement is performed, primary antibody solution containing primary antibody is supplied to a channel 24, the primary antibody is immobilized to the reaction field 8, and the primary antibody solution is recovered from the channel 24. Subsequently, a specimen solution containing an antigen such as protein is supplied to the channel 24, the antigen is bound to the primary antibody, and the specimen liquid is recovered from the channel 24. Next, a secondary antibody solution containing a secondary antibody labeled with a fluorescent substance is supplied to the channel 24, and the secondary antibody is bound to the antigen.

When the measurement is performed, the excitation light EL is guided to be incident on the prism 4. The excitation light EL incident on the prism 4 is reflected at an interface between the metal thin film 6 and the prism 4, and exits from the prism 4 as the reflected light RL. The incident angle of the excitation light EL to the interface between the metal thin film 6 and the prism 4 is set to a resonance angle θ1.

During emission of the excitation light EL to the prism 4, an evanescent wave leaks from the interface between the metal thin film 6 and the prism 4 to the metal thin film 6 side, allowing resonance between the evanescent wave and the plasmon on the surface of the metal thin film 6. This enhances an electric field of the evanescent wave. This enhanced electric field acts on the fluorescent substance, and the fluorescence FL is emitted from the reaction field 8. The light amount of the fluorescence FL is measured by the light measurement means 18. Subsequently, the presence or absence of an antigen, a trapping amount of an antigen, or the like, are obtained from the light amount of the fluorescence FL.

Next, a measurement abnormality detecting method of determining measurement abnormality of the fluorescence FL using the measuring device 2 according to the present embodiment will be described using an exemplary case where it is determined that a measurement result is accurate.

FIG. 2 is a top view of the chip structure 12. FIG. 3 is a view illustrating positions of irradiation areas in the reaction field 8 to which excitation light is emitted and a measurement result of fluorescence. Description of the present embodiment will use an exemplary case where the driving means 31 moves the chip structure 12 in the X direction and the light amount of the fluorescence FL is measured three times (light measurement step). First, as illustrated in FIG. 3A, at a first time, the excitation light EL is emitted to a first irradiation area E1 located at a center in the X direction of the reaction field 8, and then, the light amount of the fluorescence FL emitted from the first irradiation area E1 and transmitted through the light collecting member 20 and the filter 22 is measured by the light measurement means 18 (first measurement).

At a second time, the position of the chip structure 12 is moved in the −X direction by the driving means 31. The excitation light EL is emitted to a second irradiation area E2 located at a bottom of the reaction field 8 in FIG. 3A (hereinafter referred to as the bottom), and then, the light amount of the fluorescence FL emitted from the second irradiation area E2 is measured by the light measurement means 18 (second measurement).

Figure 3B:
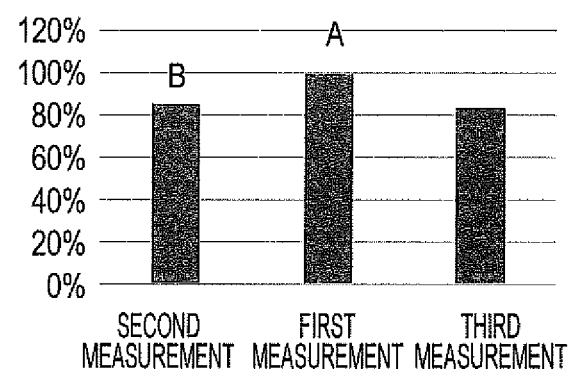
Figure 4A:
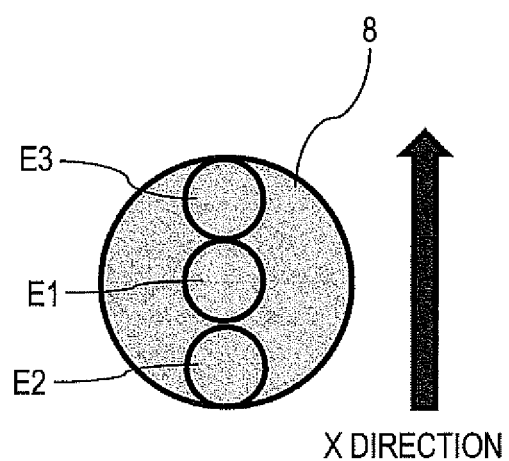
FIG. 4 is a view illustrating a position of an irradiation area and a measurement result of fluorescence according to a modified example of the embodiment.
Figure 4B:
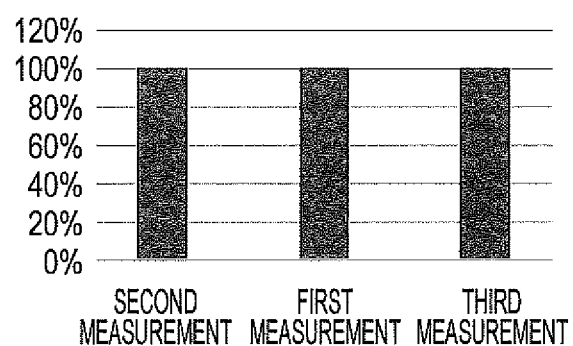

Here, in the second measurement, measurement is performed so that the lower part of the second irradiation area E2 overlaps with the first irradiation area E1. Note that the fluorescent substance that labels the antigen has a property that the color fades (fading property) every time the substance is irradiated with the excitation light EL. Therefore, as illustrated in the graph of FIG. 3B, when a measurement value of the light amount of the fluorescence FL obtained in the first measurement (hereinafter abbreviated as the measurement value) is 100%, the measurement value obtained at the second measurement is a little more than 80%. Note that as illustrated in FIG. 4, when measurement is performed without overlapping irradiation areas, the fluorescent substance would not fade, and thus, all measurement values are the same value.

At a third time, the position of the chip structure 12 is moved in the +X direction by the driving means 31. The excitation light EL is emitted to a third irradiation area E3 located at a top of the reaction field 8 in FIG. 3A (hereinafter referred to as the top), and then, the light amount of the fluorescence FL emitted from the third irradiation area E3 is measured by the light measurement means 18 (third measurement).

Note that, in the present embodiment, a movement amount of the chip structure 12 in the X direction at the second and third measurements is set in consideration of the size of the reaction field 8, the size of the irradiation area, and a position error between the reaction field 8 and the first irradiation area E1.

For example, here is an exemplary case where the size of the reaction field 8 is not sufficient compared with the size of the irradiation area, being a case where the size of the reaction field 8 is less than three times the size of the irradiation area, for example. In this case, the movement amount of the chip structure 12 in the X direction is reduced to be smaller than the size of the first irradiation area E1 so as to allow the first irradiation area E1 and the second irradiation area E2 to partially overlap with each other as illustrated in FIG. 3A, for example.

With this arrangement, even when the first irradiation area E1 is slightly displaced from the center of the reaction field 8, at least one of the second irradiation area E2 and the third irradiation area E3 is substantially included in the reaction field 8. This makes it possible to correctly obtain comparison measurement values described below, leading to achievement of detection of measurement abnormality with high accuracy.

In contrast, here is an exemplary case where the size of the reaction field 8 is sufficient compared with the size of the irradiation area, being a case where the size of the reaction field 8 three times the size of the irradiation area, or more, for example. In this case, the movement amount of the chip structure 12 in the X direction is increased to be larger than the size of the first irradiation area E1 so as to suppress overlapping of the first irradiation area E1 and the second irradiation area E2 as illustrated in FIG. 4A, for example. This would eliminate the influence of fading of the fluorescent substance, making it possible to detect the measurement abnormality with higher accuracy.

Furthermore, it is desirable that the movement amount of the chip structure 12 in the X direction be at least 0.5 times the size of the irradiation area. With the setting of the movement amount of the chip structure 12 in the X direction to be less than 0.5 times the size of the irradiation area, three areas, that is, the first irradiation area E1, the second irradiation area E2, and the third irradiation area E3 might overlap with each other. Overlapping of the three irradiation areas might greatly increase an influence of fading of the fluorescent substance in the overlapping irradiation area, and this might degrade measurement abnormality detection accuracy.

After the third measurement, the control means 33 determines whether the light amount is measured normally (determination step). Specifically, first, the first measurement value is compared with a highest measurement value among the measurement values obtained for second and subsequent times. Here, the first measurement value is a measurement value serving as a measurement reference, which is going to be a measurement value of this measurement. A reason for adopting the first measurement value as a result of this measurement is because the measurement values obtained in the second and subsequent times include influence of dissociation of the antigen antibody and fading of the fluorescent substance. Accordingly, in the following description, the first measurement value is defined as a reference measurement value A, and the highest measurement value among the measurement values obtained for the second and subsequent times is set as a comparison measurement value B.

In a case where the reference measurement value A is lower than the comparison measurement value B (A<B), determination of measurement abnormality is made. In a case where the reference measurement value A is not lower than the comparison measurement value B (A ≥B), determination of normal measurement is made. In the case illustrated in FIG. 3, since the reference measurement value A is higher than the comparison measurement value B (A ≥B), determination of normal measurement is made. Note that the measurement in the present embodiment is directed to a measurement value being a detection limit or above. The detection limit represents a minimum detectable amount and is also referred to as a lower detection limit. This means, in typical usage, the minimum concentration that can be separated from the blank measurement value including variation.

Next, a case where determination of measurement abnormality is made will be described. The determination of the measurement abnormality is made mainly in a case where an inhibition factor that inhibits reaction or measurement, such as a bubble or foreign body, is located in the irradiation area and this lowers the light amount of the fluorescence FL to be measured.

Figure 5:
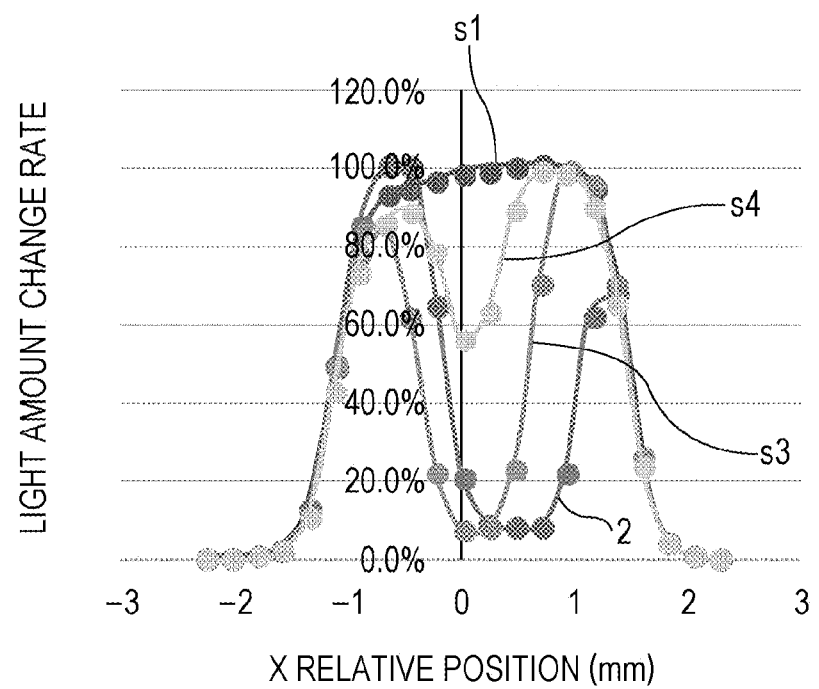
FIG. 5 is a graph indicating comparison of the light amount of fluorescence varying depending on size of a bubble.
Figure 6A:
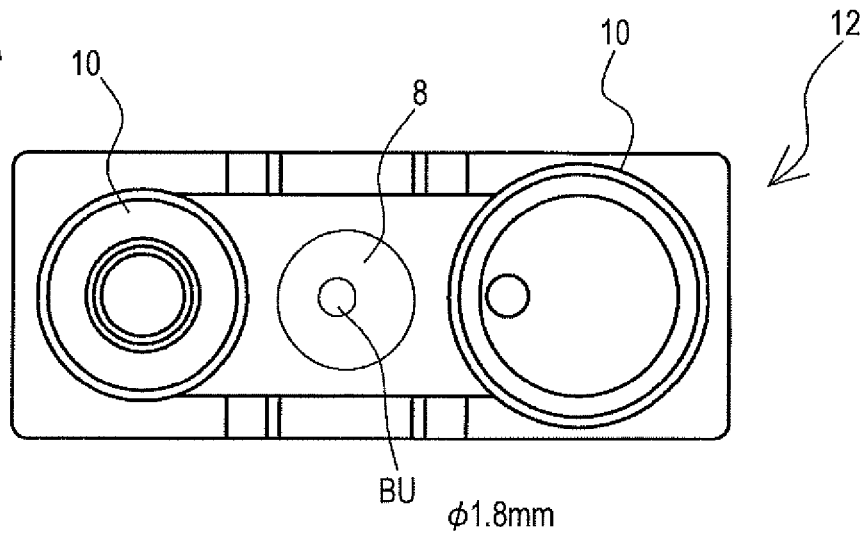
FIG. 6 is a top view of a chip structure having a bubble included in a channel.
Figure 6B:
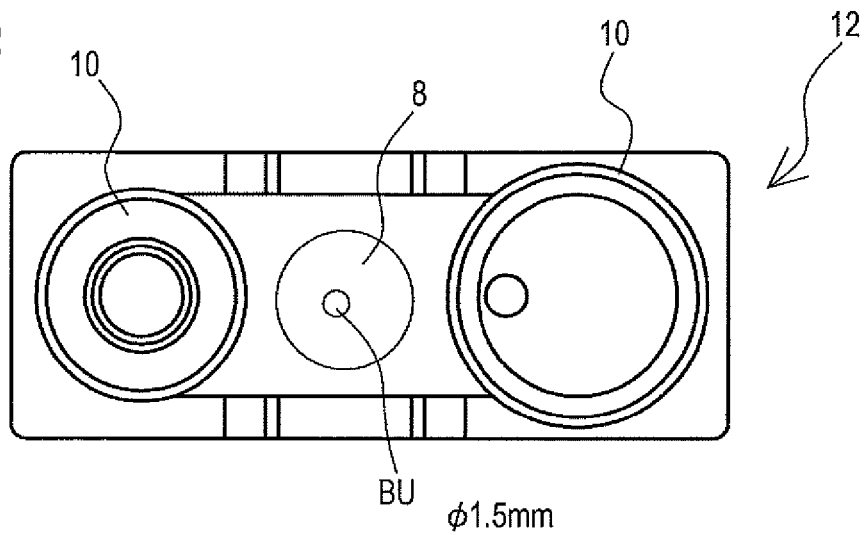
Figure 6C:
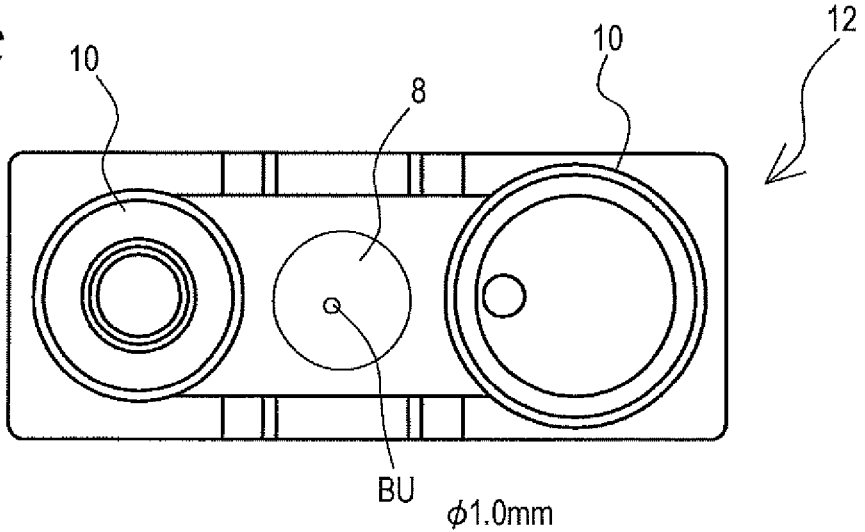

FIG. 5 is a graph comparing light amounts of the fluorescence FL varying with the bubble size. Here, s1 illustrated in FIG. 5 is a light amount change rate in a case where the fluorescence FL is measured while the chip structure 12 (refer to FIG. 2) not including a bubble is moved in the +X direction. In contrast, s2, s3 and s4 are light amount change rates in a case where the fluorescence FL is measured while three types of chip structure 12 are moved in the +X direction. Specifically, s2 is a case using the chip structure 12 (refer to FIG. 6A in which a bubble BU of φ 1.8 mm is included in the channel 24; s3 is a case using the chip structure 12 (refer to FIG. 6B in which a bubble BU of φ 1.5 mm is included in the channel 24; and s4 is a case using the chip structure 12 (refer to FIG. 6) in which a bubble BU of φ 1.0 mm is included in the channel 24. The size of the irradiation area was φ 1.5 mm.

As illustrated in FIG. 5, the greater the size of the bubble BU, the lower the light amount of the fluorescence FL. Here, in s2 (φ 1.8 mm) where the size of the bubble BU is greater than the size of the irradiation area and in s3 (φ 1.5 mm) where the size of the bubble BU is equivalent to the irradiation area, it is observed that the light amount of the fluorescence FL decreases by 90% or more at the position where the bubble BU and the irradiation area substantially overlap each other.

Figure 7:
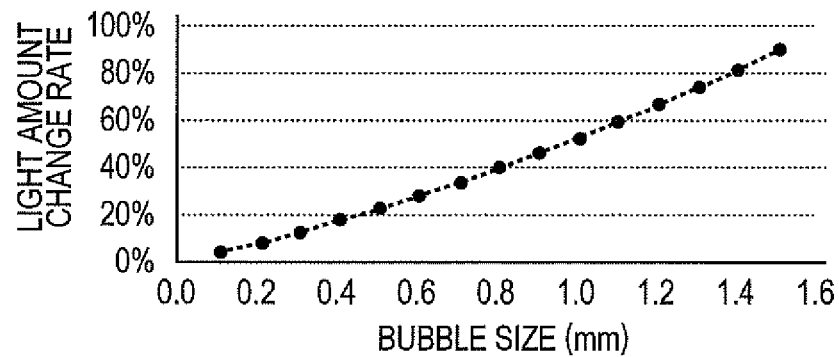
FIG. 7 is a graph illustrating a relationship between size of a bubble included in the irradiation area and the light amount of fluorescence according to the embodiment.

FIG. 7 is a graph illustrating a relationship between the size of the bubble BU included in the irradiation area and the light amount of the fluorescence FL. As illustrated in FIG. 7, it is observed that the size of the bubble BU and the decrease rate of the light amount of the fluorescence FL are substantially proportional and that the decrease rate is 100% when the size of the bubble BU is substantially equal to the size of the irradiation area.

The following is description of Examples in a case where determination of measurement abnormality is made because bubble BU is included in the first irradiation area E1. Note that Examples include measurements performed for the second and third times in a state where the irradiation areas were shifted by 0.8 mm in the X direction after completion of the first main measurement. In Examples 1 to 4, determination of the reference measurement value A is made without correcting the value by a coefficient to be described below.

Example 1

Figure 8A:
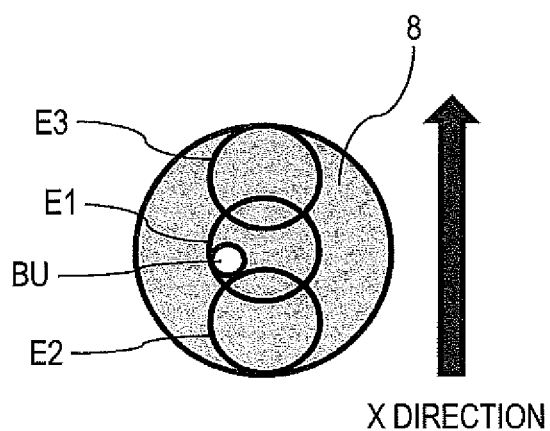
FIG. 8 is a view illustrating a position of an irradiation area and a measurement result of fluorescence in Example 1.
Figure 8B:
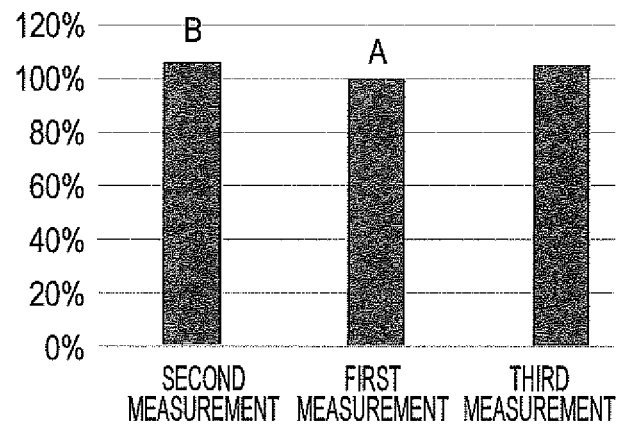

FIG. 8 is a view illustrating a position of the irradiation area and a fluorescence measurement result in a case where the measurement is performed by the same procedure as described with reference to FIG. 3. In Example 1, inclusion of the bubble BU in the first irradiation area E1 as illustrated in FIG. 8A causes reduction of the light amount of the fluorescence FL measured in the first measurement. For this reason, as illustrated in FIG. 8B, the reference measurement value A is lower than the comparison measurement value B (A<B), leading to a determination of measurement abnormality.

Example 2

Figure 9A:
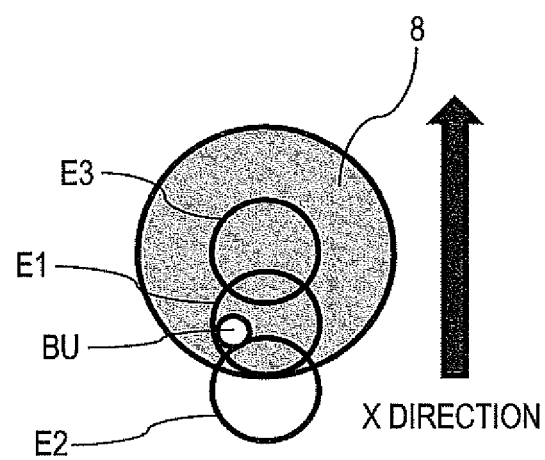
FIG. 9 is a view illustrating a position of an irradiation area and a measurement result of fluorescence in Example 2.
Figure 9B:
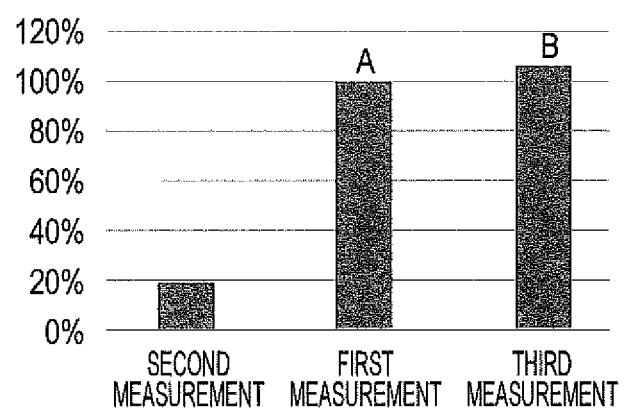

As illustrated in FIG. 9A, Example 2 is a measurement example in which the first irradiation area E1 is shifted downward in the center of the reaction field 8 in the first measurement. In this case, the second irradiation area E2 and the third irradiation area E3 are also shifted downward. A substantial part of the second irradiation area E2 is located in a portion deviating from the reaction field 8 (portion where no fluorescent substance is present). Therefore, as illustrated in FIG. 9B, the value obtained by the second measurement is significantly lower than the measurement value obtained by the third measurement, and the measurement value obtained by the third measurement is to be the comparison measurement value B. Here, since the bubble BU is included in the first irradiation area E1 and this decreases the light amount of the fluorescence FL obtained in the first measurement. This results in the reference measurement value A lower than the comparison measurement value B (A<B), leading to determination of measurement abnormality.

Example 3

Figure 10A:
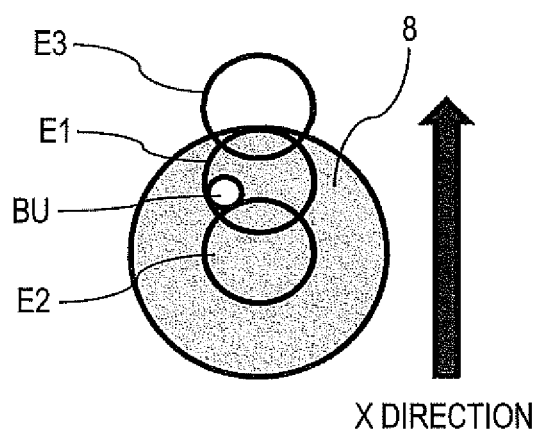
FIG. 10 is a view illustrating a position of an irradiation area and a measurement result of fluorescence in Example 3.
Figure 10B:
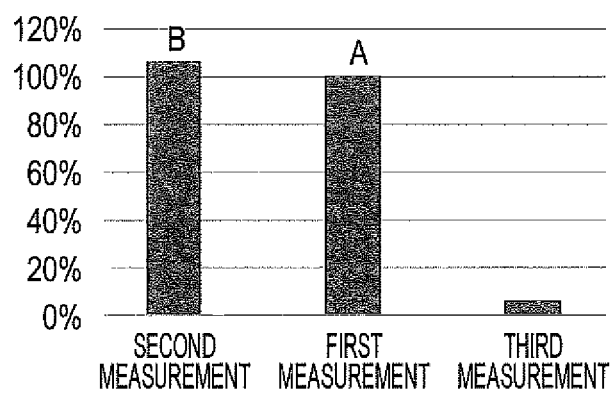

As illustrated in FIG. 10A, Example 3 is a measurement example in which the first irradiation area E1 is shifted upward from the center of the reaction field 8 in the first measurement, as opposed to the Example 2. In this case, the second irradiation area E2 and the third irradiation area E3 are also shifted upward. A substantial part of the third irradiation area E3 is located in a portion deviating from the reaction field 8. Therefore, as illustrated in FIG. 10B, the value obtained in the third measurement is significantly lower than the measurement value obtained in the second measurement, and the measurement value obtained in the second measurement is to be the comparison measurement value B. Here, the reference measurement value A obtained by the measurement of the first irradiation area E1 including the bubble BU is lower than the comparison measurement value B (A<B), leading to determination of measurement abnormality.

Example 4

Figure 11A:
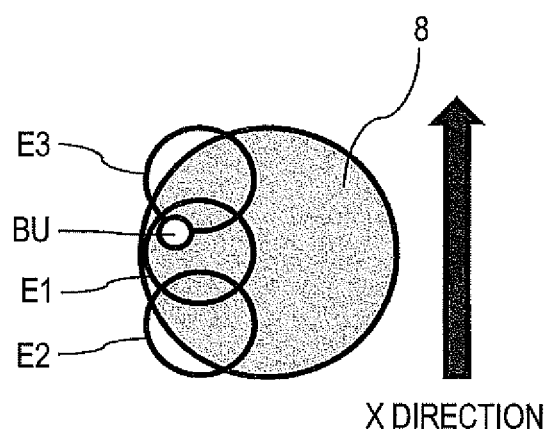
FIG. 11 is a view illustrating a position of an irradiation area and a measurement result of fluorescence in Example 4.
Figure 11B:
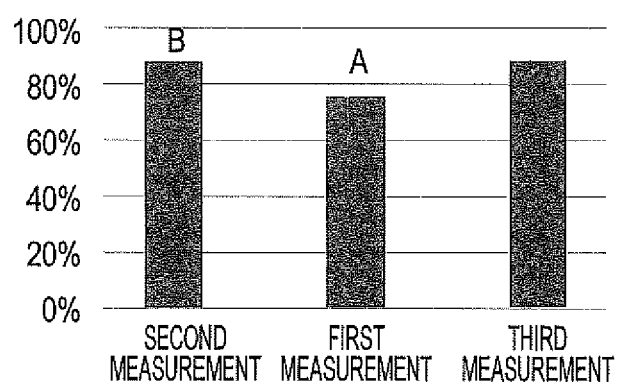

Example 4 is a measurement example in the case where the irradiation area of Example 1 is shifted leftward from the center of the reaction field 8, as illustrated in FIG. 11A. In this case, since a part of each of the second irradiation area E2 and the third irradiation area E3 deviates from the reaction field 8, measurement values obtained in the second and third measurements are lower than the measurement values in a case where the second irradiation area E2 and the third irradiation area E3 are located within the reaction field 8. On the other hand, since the bubble BU is included in the first irradiation area E1, the first measurement value also decreases as compared with the case where the bubble BU is not included. In Example 4, as illustrated in FIG. 11B, because the reference measurement value A is lower than the comparison measurement value B (A<B), leading to determination of measurement abnormality.

Figure 12A:
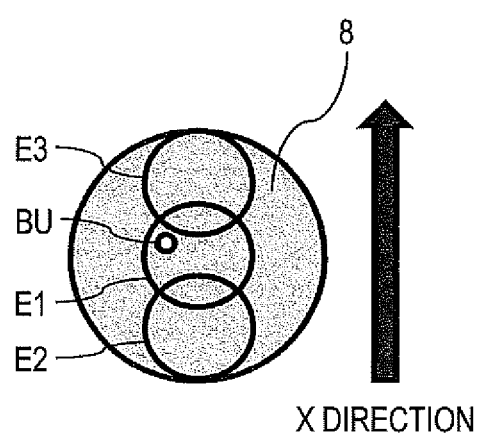
FIG. 12 is a view illustrating a position of an irradiation area and a measurement result of fluorescence in a modification of Example 4.
Figure 12B:
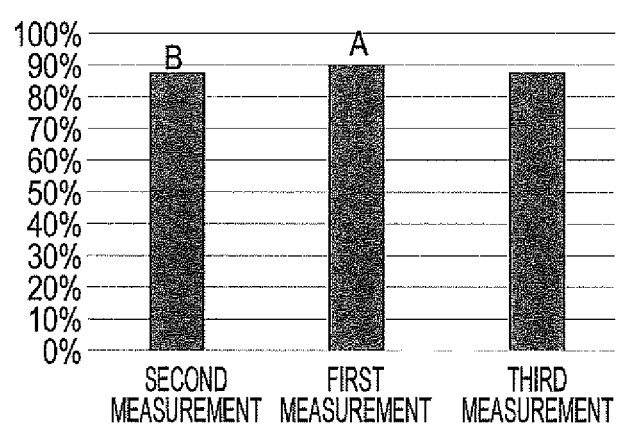

While the above describes exemplary cases in which determination of measurement abnormality is made using Examples 1 to 4 as specific examples, there may be a case where accurate determination is difficult even when measurement is performed as indicated in Examples 1 to 4. For example, in a case where the bubble BU of Example 4 is small as illustrated in FIG. 12A, the reference measurement value A becomes slightly higher than the comparison measurement value B, leading to determination of normal measurement, as illustrated in FIG. 12B. In such a case, correction is performed by multiplying the reference measurement value A by a coefficient so as to increase the accuracy in measurement abnormality determination. The coefficient is calculated from an area of a portion having mutually overlapping irradiation areas and from the degree of fading property of the fluorescent substance (hereinafter referred to as fading rate). The higher the fading rate of the fluorescent substance, the smaller the coefficient; the lower the fading rate of the fluorescent substance, the greater the coefficient. Moreover, the larger the area of an overlapping portion where the first irradiation area E1 being a measurement target and another irradiation area overlap with each other, the smaller the coefficient. The smaller the area of the overlapping portion, the greater the coefficient.

Example 5

In Example 5, a measurement example in a case where the reference measurement value A is corrected by using a coefficient will be described. Here, FIG. 13 is a view illustrating positions of the irradiation area on the chip structure 12 and the bubble BU at the light amount measurement of the fluorescence FL. In addition, in the reaction field 8 of Example 5, a fluorescent substance having a fading rate higher than a predetermined fading rate (that is, easy to fade) is used for the labeling the antigen.

Here is an exemplary case where determination of the measurement abnormality is made without performing correcting by a coefficient under a normal state in which no bubbles are included in the first irradiation area E1. In this situation, the second measurement value (comparison measurement value B) is 5% lower than the first measurement value (reference measurement value A) because of the effect of fading due to overlapping irradiation areas, for example.

Figure 14:
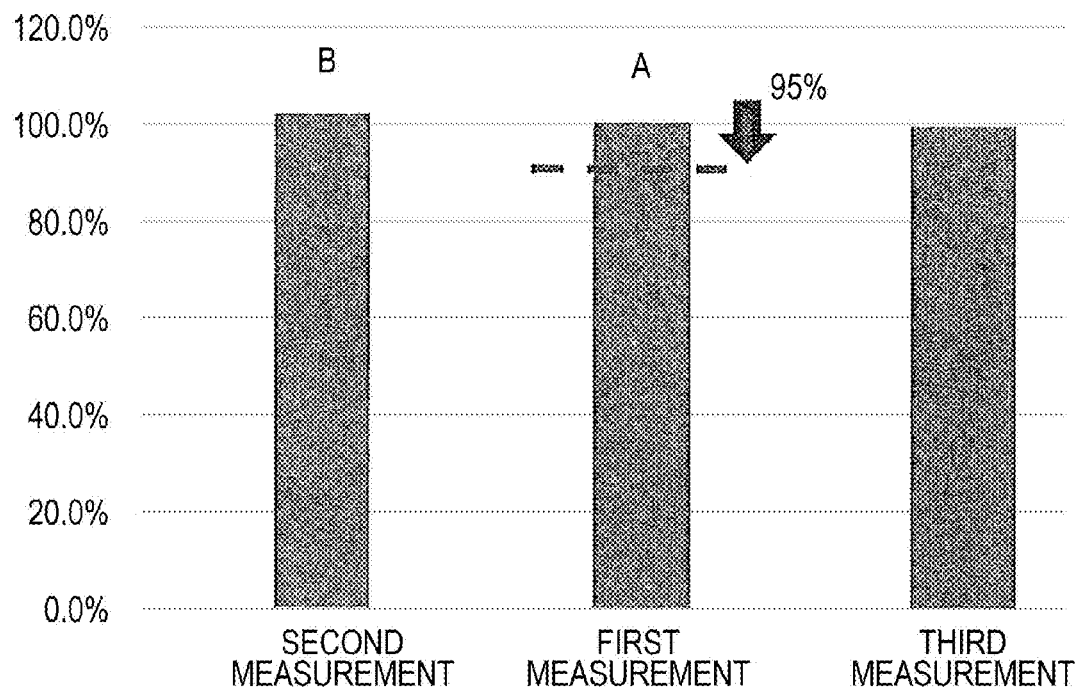
FIG. 14 is a diagram illustrating a measurement result of Example 5.

In this case, if measurements are performed in a state where a bubble is included in the first irradiation area E1, and in a case where the size of the bubble BU is relatively small and the degree of influence is about 5%, the first measurement value (reference measurement value A) would also be 5% lower than a proper measurement value. Accordingly, as illustrated in FIG. 14, there is substantially no difference between the first measurement value (reference measurement value A) and the second measurement value (comparison measurement value B). Therefore, when the first measurement value and the second and subsequent measurement values are the same, it might be determined to be a normal measurement.

This case can be handled, for example, by calculating a coefficient of 95% on the basis of the fading rate of the fluorescent substance and on the basis of the area of the overlapping portion in the irradiation area, and then, as illustrated by the arrow in FIG. 14 so as to lower the reference measurement value A being 100% to 95%. With this operation, the reference measurement value A becomes lower than the comparison measurement value B (A<B), leading to determination of abnormal measurement. With this correction, even in a case where the fluorescent substance easily fades, it is also possible to accurately perform measurement abnormality determination even with a relatively small foreign body included in the first irradiation area E1.

Example 6

Figure 15:
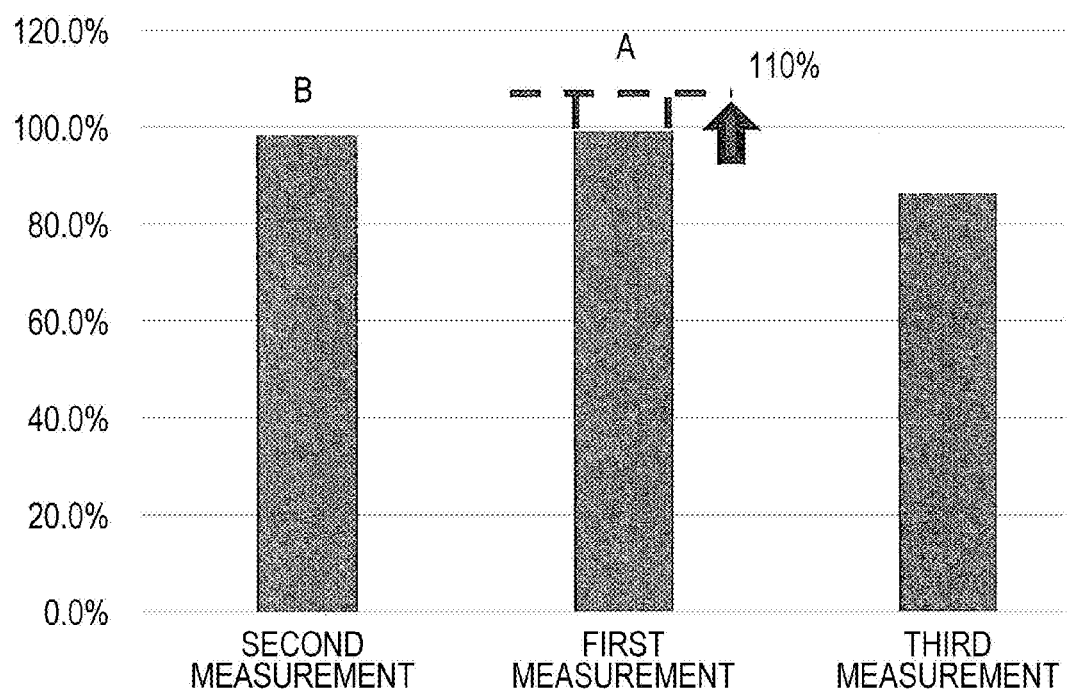
FIG. 15 is a diagram illustrating a measurement result of Example 6.
Figure 16A:
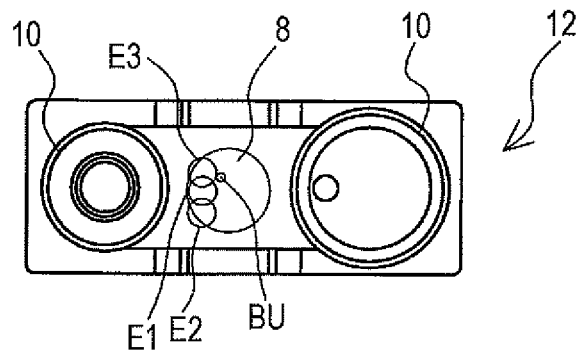
FIG. 16 is a view illustrating a specific example of positions of a bubble in a case where no measurement abnormality determination is made in the measuring device according to the embodiment.
Figure 16B:
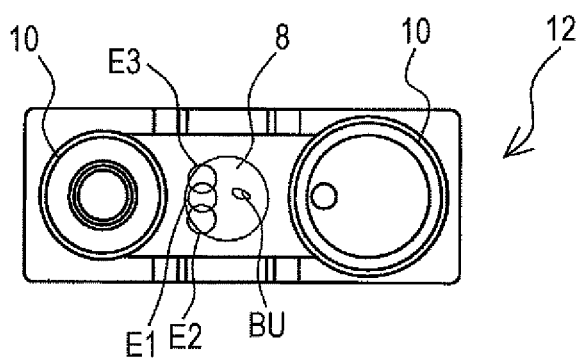
Figure 16C:
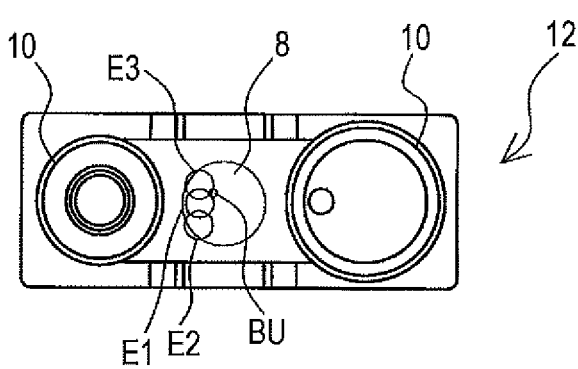
Figure 16D:
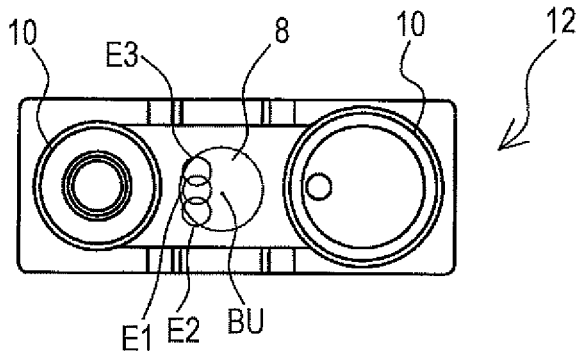

Example 6 will be described as a case where there is unevenness in the amount of the primary antibody that traps an analyte in a plane of the reaction field 8 and where a fluorescent substance labeled to the antigen would not easily fade. First, in a case where the fading rate of the fluorescent substance is low, it is difficult to make a difference between the first measurement value and the second measurement value even when the first irradiation area E1 and the second irradiation area E2 partially overlap. In an ideal state where there is no unevenness in the amount of the primary antibody that traps the analyte in the plane of the reaction field 8 in particular, the first measurement value and the second measurement value are substantially equal as illustrated in FIG. 15. However, in a case where there is unevenness in the concentration for trapping the analyte in the plane of the reaction field 8, and the second irradiation area E2 has trapped an analyte having a higher concentration than the first irradiation area E1, the first measurement value would become lower than the second measurement value even without the presence of the bubble BU, leading to false positive determination of measurement abnormality.

In order to handle this case, the first measurement value will be multiplied by a coefficient calculated in consideration of the assumed unevenness of the primary antibody amount, namely, a coefficient 110% exceeding 100%, for example, so as to perform correction for raising the reference measurement value A as illustrated by an arrow in FIG. 14. With this correction, it is possible to accurately perform measurement abnormality determination even when there is unevenness in the amount of the primary antibody that traps the analyte in the plane of the reaction field 8 and when the fluorescent substance would not easily fade.

According to the present embodiment of the disclosure, it is possible to detect the measurement abnormality on the basis of the measurement result obtained by the light measurement means 18. Therefore, it is necessary to mount a camera or other optical systems for detecting the measurement abnormality. This makes it possible to easily detect the measurement abnormality without increasing load in hardware.

In addition, with execution of determination by multiplying the reference measurement value A by a coefficient, it is possible to accurately determine measurement abnormality for a relatively small foreign body in a system with large amount of fading of a fluorescent substance or a system having uneven trapping concentration in a reaction field. For this reason, for example, it would be possible to appropriately prevent a situation in which negative judgment is erroneously made (false negative) by detection of a low measurement value even though the antigen should be positive, as a result of failure in performing normal reaction or measurement due to the presence of the bubble BU in the reaction field 8.

Furthermore, the determination of the measurement abnormality is made using the light amount of the fluorescence FL measured by the light measurement means 18 instead of grasping the position or the like of the bubble BU successively using a camera or the like. With this method, it is possible to determine even an abnormality during the reaction, such as hindrance of binding of the primary antibody and antigen due to the bubble BU when the bubble BU is not contained in the measurement area at the measurement.

That is, according to the present embodiment of the disclosure, it is possible to provide a measuring device and a measurement abnormality detecting method capable of easily detecting a measurement abnormality occurring during measurement or reaction without increasing load in hardware.

Additionally, FIG. 16 is a view illustrating specific positions of the bubble BU in a case where no measurement abnormality is determined in the above embodiment. In FIG. 16A, since the position of the bubble BU is shifted upward from the first irradiation area E1, the measurement would not be influenced by the bubble BU. Furthermore, in FIG. 16B, since the position of the bubble BU is shifted rightward from the first irradiation area E1, the measurement would not be influenced by the bubble BU. In FIG. 16C, the position of the bubble BU is slightly overlapped with the first irradiation area E1, but this would not influence the measurement so much since it is displaced upward. In FIG. 16D, since the bubble BU is small and its position is shifted rightward from the first irradiation area E1, the measurement would not be influenced by the bubble BU.

While the above-described embodiment moves the chip structure 12 in the X direction to measure the light amount of the fluorescence FL three times, the measurement may be performed three or more times. For example, it is allowable to first move the chip structure 12 in the X direction and perform measurement of the light intensity of the fluorescence FL three times, and thereafter move the chip structure 12 in a Y direction (direction orthogonal to the X direction) across the first irradiation area E1, and in this state, it is possible to perform the measurement of the light amount of the fluorescence FL twice more so as to perform a total of five times of measurement. In this manner, it is allowable to perform the measurement two-dimensionally. With this configuration, for example, even in a case where bubbles are aligned in the X direction and it would difficult to determine the measurement abnormality by three measurements with the irradiation area shifted in the X direction, it is possible to define the measurement value obtained by shifting the irradiation area in the Y direction, namely, direction with no presence of the bubble as the comparison measurement value B. This makes it possible to accurately determine the measurement abnormality.

The above-described embodiment is an example where the bubble BU is included in the first irradiation area E1 as the measurement inhibition factor. However, the measurement inhibition factor may be a foreign body such as fibrin or dust. Even when foreign body is present, the measurement value decreases in accordance with the size of foreign body like the bubble BU.

Furthermore, the above-described embodiment is an exemplary case where the position of the chip structure 12 is moved by the driving means 31 to allow the measurement varied irradiation area positions. However, it is also allowable to use the driving means 31 to move the light emission means 14 to perform the measurement. Alternatively, measurement may be performed by moving both the chip structure 12 and the light emission means 14. Furthermore, in a case where the light measuring position would be shifted by moving the light emission means 14, the light measurement means 18 may also be moved to perform the measurement.

In the above-described embodiment, the measuring device 2 for SPFS is described as an example. However, the measuring device and the measurement abnormality detecting method of the present disclosure are not limited to the SPFS.

Furthermore, the present disclosure includes as an aspect; a program for causing a computer to execute the above-described measurement abnormality detection; and a computer-readable recording medium such as a magnetic tape (digital data storage (DSS)), a magnetic disk (hard disk drive (HDD), a flexible disk (FD), etc.), an optical disk (a compact disk (CD), a digital versatile disk (DVD), a Blu-ray disk (BD), etc.), a magneto optical disk (MO), a flash memory (Solid State Drive (SSD), a memory card, a USB memory, etc.).

As used throughout this application, the words "can" and "may" are used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

REFERENCE SIGNS LIST
2 Measuring device
4 Prism
6 Metal thin film
8 Reaction field
12 Chip structure
14 Emission means
16 Light receiving means
18 Light measurement means
20 Light collecting member
22 Filter
24 Channel
31 Driving means
33 Control means
EL Excitation light
FL Fluorescence
RL Reflected light

What is claimed is:

1. A measuring device, comprising:
an emitter configured to emit light to a measurement target region;
a measurer configured to measure light output from the measurement target region by emission with the means for emitting light;
a driver configured to adjust a position of at least one of the measurement target region and the light emitter; and
a processor configured to (i) compare measurement values of the light measured a plurality of times by the light measurer while changing positions of the measurement target region by the driver, after initially measuring a measurement value of the light, to determine abnormality of a measurement result, and (ii) determine measurement abnormality in a case where a reference measurement value, being the initially measured measurement value, is lower than a comparison measurement value, being a highest one among the compared measurement values,
wherein the reference measurement value is lower than the comparison measurement value due to presence of at least one of a bubble and a foreign body in a first irradiation area corresponding to the initial measurement, the presence occurring neither in a second irradiation area corresponding to one of the subsequent measurements nor in a third irradiation area corresponding to another of the subsequent measurements, and
wherein the initial measurement is less than the highest one measurement notwithstanding at least one of a (i) dissociation of an antigen antibody or (ii) fading of a fluorescent substance due to at least one of an overlapping region between the first and second irradiation areas or an overlapping region between the first and third irradiation areas.

2. The measuring device according to claim 1, wherein irradiation by the light emitter is performed three or more times across the first irradiation area.

3. The measuring device according to claim 2, wherein the processor uses the reference measurement value, the reference measurement value being corrected by the processor using a predetermined coefficient at a time of determination of measurement abnormality.

4. The measuring device according to claim 3, wherein the measurement target region is a reaction field in which a biochemical reaction is performed, and
wherein the measurement result is calculated from an amount of light emitted from the fluorescent substance positioned in the reaction field.

5. The measuring device according to claim 4, wherein the predetermined coefficient is calculated by using an area of a portion in which the first irradiation area overlaps with another irradiation area and using a fading rate of the fluorescent substance.

6. The measuring device according to claim 1, wherein determination by the processor is directed to a measurement value of the light amount, being a detection limit or above.

7. A measurement abnormality detecting method, comprising:
emitting light to a measurement target region and thereby measuring light output from the measurement target region; and
comparing measurement values of the light measured a plurality of times, while changing positions of the measurement target region, after initially measuring a measurement value of the light, to determine abnormality of a measurement result,
wherein the abnormality is determined in a case where a reference measurement value, being the initially measured measurement value, is lower than a comparison measurement value, being a highest one among the compared measurement values,
wherein the reference measurement value is lower than the comparison measurement value due to presence of at least one of a bubble and a foreign body in a first irradiation area corresponding to the initial measurement, the presence occurring neither in a second irradiation area corresponding to one of the subsequent measurements nor in a third irradiation area corresponding to another of the subsequent measurements, and
wherein the initial measurement is less than the highest one measurement notwithstanding at least one of a (i) dissociation of an antigen antibody or (ii) fading of a fluorescent substance due to at least one of an overlapping region between the first and second irradiation areas or an overlapping region between the first and third irradiation areas.

8. The measurement abnormality detecting method according to claim 7, wherein irradiation of the measurement target region is performed three or more times across the first irradiation area.

9. The measurement abnormality detecting method according to claim 8, wherein the determining uses the reference measurement value corrected by using a predetermined coefficient at a time of determination of measurement abnormality.

10. The measurement abnormality detecting method according to claim 9, wherein the measurement target region is a reaction field in which a biochemical reaction is performed, and
wherein the measurement result is calculated from an amount of light emitted from the fluorescent substance positioned in the reaction field.

11. The measurement abnormality detecting method according to claim 10, wherein the predetermined coefficient is calculated by using an area of a portion in which the first irradiation area overlaps with another irradiation area and using a fading rate of the fluorescent substance.

12. The measurement abnormality detecting method according to claim 7, wherein the determination is directed to a measurement value of the light amount, being a detection limit or above.

13. A non-transitory recording medium storing a computer readable program causing a computer to execute functions, comprising:
emitting light to a measurement target region and thereby measuring light output from the measurement target region; and
comparing measurement values of the light measured a plurality of times, while changing position of the measurement target region, after initially measuring a measurement value of the light, to determine abnormality of a measurement result,
wherein the determining determines measurement abnormality in a case where a reference measurement value, being the initially measured measurement value, is lower than a comparison measurement value, being a highest one among the compared measurement values,
wherein the reference measurement value is lower than the comparison measurement value due to presence of at least one of a bubble and a foreign body in a first irradiation area corresponding to the initial measurement, the presence occurring neither in a second irradiation area corresponding to one of the subsequent measurements nor in a third irradiation area corresponding to another of the subsequent measurements, and
wherein the initial measurement is less than the highest one measurement notwithstanding at least one of a (i) dissociation of an antigen antibody or (ii) fading of a fluorescent substance due to at least one of an overlapping region between the first and second irradiation areas or an overlapping region between the first and third irradiation areas.

14. The measuring device according to claim 1, wherein irradiation by the light emitter is performed three or more times across the first irradiation area.

15. The measuring device according to claim 1, wherein the processor uses the reference measurement value corrected by using a predetermined coefficient at a time of determination of measurement abnormality.

16. The measuring device according to claim 1, wherein the measurement target region is a reaction field in which a biochemical reaction is performed, and
wherein the measurement result is calculated from an amount of light emitted from the fluorescent substance positioned in the reaction field.

* * * * *